United States Patent [19]

Buckler

[11] 4,105,815

[45] Aug. 8, 1978

[54] FLAT BATTERY WITH ELECTRODES IN SLURRY FORM

[75] Inventor: Sheldon A. Buckler, Lincoln, Mass.

[73] Assignee: Polaroid Corporation, Cambridge, Mass.

[21] Appl. No.: 744,871

[22] Filed: Nov. 24, 1976

Related U.S. Application Data

[63] Continuation-in-part of Ser. No. 495,681, Aug. 8, 1974, abandoned.

[51] Int. Cl.² .............................................. H01M 6/46
[52] U.S. Cl. .................................. 429/152; 429/162; 429/199; 429/224; 429/229
[58] Field of Search ............................... 429/152–162, 429/133, 63, 199, 224, 229

[56] References Cited

U.S. PATENT DOCUMENTS

| | | | |
|---|---|---|---|
| 2,870,235 | 1/1959 | Soltis | 429/162 X |
| 2,960,558 | 11/1960 | Marsal et al. | 429/63 |
| 3,056,849 | 10/1962 | Warren et al. | 429/229 X |
| 3,069,485 | 12/1962 | Winger et al. | 429/133 |
| 3,098,771 | 7/1963 | Huber | 429/199 |
| 3,770,504 | 11/1973 | Bergum | 429/152 |
| 3,784,410 | 1/1974 | Bergum et al. | 429/152 |
| 3,996,068 | 12/1976 | Urry | 429/166 X |
| 4,007,472 | 2/1977 | Land | 429/153 |

*Primary Examiner*—Charles F. Lefevour
*Attorney, Agent, or Firm*—John W. Ericson

[57] ABSTRACT

Thin flat Leclanche cells and batteries comprising cathodes in the form of slurries of manganese dioxide and carbon in an electrolyte solution containing from 23 to 30 percent of water based on the weight of the slurry. The anodes may be of conventional dry patch construction, or may take the form of slurries of zinc powder in an electrolyte solution containing from 25 to 40 percent of water based on the weight of the anode slurry.

23 Claims, 15 Drawing Figures

FLAT BATTERY WITH ELECTRODES IN SLURRY FORM

This application is a continuation-in-part of my copending U.S. application Ser. No. 495,681, filed on Aug. 8, 1974 for Flat Battery now abandoned and assigned to the assignee of this application.

This invention relates to electrical cells and batteries, and particularly to a novel cell and battery construction especially suited to very high current drain applications.

An automatic photographic system currently in widespread use comprises the Polaroid SX-70 Land Camera, equipped to expose and process film units provided in cassettes of ten. All power for this system is supplied by a thin, flat, disposable battery in each cassette.

The requirements of a disposable battery suitable for use in an automatic photographic system such as the Polaroid SX-70 Land system are onerous. In order to operate the camera and eject and process the film units, relatively high current drain capability as well as adequate capacity are needed in a package that is both highly compact and sufficiently inexpensive to justify its disposal after the film units with which it is packaged have been exposed and processed.

Still more ambitious goals have been proposed for automatic photographic systems powered by compact, disposable batteries. In U.S. Pat. No. 3,846,812, issued on Nov. 5, 1974 to Conrad H. Biber for Automatic Electronic Flash Camera, the desirability of obtaining the power for an electronic flash unit, as well as for the camera, from the battery in the Polaroid SX-70 film pack is expressed, and circuits are described for dividing the operating cycle of the camera in such a way as to minimize the requirements on the battery. Assuming a flash unit of relatively modest output for the SX-70 format, and typical recharge times of ten to twenty seconds, it is thus possible to use the battery currently sold in the SX-70 film pack even for this considerably more demanding purpose. The ability to use a more powerful flash unit, while obtaining shorter recharge times, would obviously be welcomed. However, the current production battery is not capable of the greatly increased requirements of power and current density that such an extension would imply.

It would obviously be a simple matter to increase the capabilities of the system by considerably increasing the size of the battery, or by using a plurality of batteries. Neither expedient would be compatible with the concept of a compact and self-contained system, in which the battery makes negligible contribution to the size of the film pack, being for the most part disposed in unused space under the film advance spring.

The current production battery is disposed on a card about 3.5 by 4.2 inches, has external dimensions of about 2.75 by 3.42 by 0.125 inches, and has an active electrode area of about 4.7 square inches. It is possible to increase the electrode area by about twenty five percent without changing the external dimensions, effecting a significant improvement in capacity and in internal impedance. The capacity of the battery can also be increased by doubling the weight of the cathodes, at the cost of about 0.025 inches in thickness, an amount that is within the limit that the film pack will accept. In this manner, the capabilities of the battery can be increased sufficiently so that a forty watt second flash unit could be used with the camera for a full cycle of ten exposures. But the results would still leave something to be desired, in the two central respects of cost and performance.

The battery currently sold with the SX-70 film pack employs a so-called "dry patch" construction for both anodes and cathodes. These are formed by depositing slurries of particulate material, comprising zinc powder and a little carbon for the anode, and manganese dioxide with more carbon for the cathode, in aqueous systems including dispersing agents and binders. After deposition on the conductive plastic substrates used as current collectors and intercell connectors, these slurries are dried to form adherent patches. During the assembly of the battery, these dry patches are coated with gel electrolyte, whereby the anodes and cathodes are brought into electrochemical communication through the separators. This process is undesirably complex. Moreover, the binders used to hold the patches together contribute significantly to the internal impedance of the battery. The result is that when the cathode patches are increased in thickness enough to provide the capacity to handle a forty watt second flash unit in the SX-70 system, recharge times are undesirably long.

The objects of this invention are to increase the current drain capabilities of thin, laminar batteries, without a substantial increase in size, while simplifying the manufacture and thereby increasing the yields and decreasing the cost of such batteries.

Briefly, the above and other objects of the invention are attained by a novel battery construction in which the cathodes are deposited, by extrusion, for example, as slurries containing from about twenty three to about thirty percent of water, and preferably from twenty six to twenty eight percent of water, based on the weight of slurry. Where optimum performance measured by short flash unit recharge times is the first objective, it is preferred to make the anodes in conventional dry patch form. However, where manufacturing simplicity and cost are first in order of priority, assuming that good flash charging capability can also be achieved, it is preferred to make the anodes in the form of slurries containing from twenty-five to forty percent, and preferably about twenty-six to thirty-six percent, of water based on the weight of anode slurry. In this manner, the steps of drying and gel coating can be eliminated, and the addition of high impedance binders can be avoided.

Surprisingly, the absence of adhesives and binding agents in the slurries does not adversely affect the internal impedance of the batteries, as indications in the literature would lead one to expect, but quite the reverse. In particular, U.S. Pat. No. 3,617,387, issued on Nov. 2, 1971 to Carl Albert Grulke and Thomas Arthur Reilly for Battery Construction Having Cell Components Completely Internally Bonded with Adhesive proclaims the necessity for adhesive bonds in batteries for which no external compressive stress mechanism is provided. Also, in U.S. Pat. No. 2,870,235, issued on Jan. 20, 1959 to D. G. Soltis for Cathodic Envelope Cell, where wet mixes for both cathode and anode are described without any mention of binders, the elements are sealed in moistureproof envelopes and are packaged as to make possible the application and maintenance of "very heavy end-wise pressure on a stack of cells"; e.g., about 136 pounds per square inch. It has been found that when the necessary critical limits on water content in the slurries is observed, these being different for the anode and the cathode as noted, the deposition of the slurries is greatly facilitated, the leakage problems mentioned in the above-cited Soltis patent are avoided, and very low internal impedances and long shelf life can be attained without the application of external compressive stresses.

Batteries comprising both positive and negative slurry electrodes in accordance with the invention are preferably made by a novel process involving the manufacture of three basic sub-assemblies. The first of these comprises a sheet metal terminal to which is bonded a thin conductive plastic current collector. To this laminate is bonded a frame having a central opening exposing the conductive plastic over a region defining an electrode site. A positive or negative slurry electrode in accordance with the invention is extruded into this opening to form a terminal electrode assembly for the battery. The slurry deposit so made is then covered with a separator.

A series of second sub-assemblies comprises an intercell connector made from a thin sheet of conductive plastic. This intercell connector is sealed over the central opening in a frame such as that first mentioned, the borders of which extend beyond the boundaries of the intercell connector. Another deposit of slurry electrode of the first kind is extruded into the opening in the frame over the intercell connector. A separator is placed over this slurry deposit. On the opposite side of the assembly thus formed, a slurry deposit of a second kind, opposite in polarity to the electrodes of the first kind, is made by silk screening, extrusion or the like.

A third sub-assembly is made comprising an electrical terminal made from a sheet of thin metal to which there is bonded a current collector of conductive plastic such as that described above. On this laminate there is extruded a slurry deposit of the second kind mentioned above.

Sub-assemblies of the second kind are stacked in series and on the first sub-assembly described above, whereupon the third sub-assembly is added to the stack. The composite assembly so formed is then sealed around the edges to make a completed battery. By this process, thin, flat laminar batteries can be made with considerably fewer steps than in production processes practiced prior to the invention.

The manner in which cells and batteries are constructed in accordance with the invention, and considerations governing the choice of materials and proportions, will best be understood in the light of the following detailed description, together with the accompanying drawings, of various illustrative embodiments of the invention.

Figure 1:
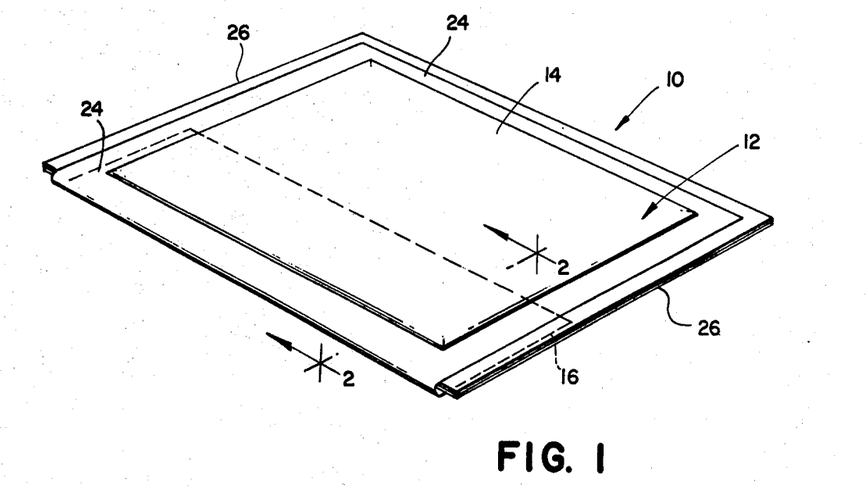
FIG. 1 is a perspective view of a flat primary battery structure according to the invention.

A multicell flat battery structure is presented generally at 10 in FIG. 1 as it would appear in an electrochemically active state following component build-up and prior to final packaging. Features of the battery structure apparent from this perspective view include an upwardly disposed anode current collector assembly 12, the outwardly facing surface 14 of which is fashioned of a metal to serve as a terminal. Current collector assembly 12 is folded about one side of battery structure 10 such that the terminal defining portion 16 of surface 14, as revealed in FIG. 2 and in phantom in FIG. 1, is located on the lower side of the battery. A cathode electrode collector assembly 20 (shown in FIGS. 2 and 3) is provided as the lowermost component of the battery and includes, in similar fashion as assembly 12, a metallic outwardly facing surface portion 22 which also serves as a terminal surface for the battery structure. With the geometry shown, cathode and anode terminals may be provided in convenient adjacency on one side of the pile assembly. The slightly depressed peripheral portion 24 of the assembly is occasioned from peripheral sealing procedures provided during assembly. This depression, as revealed in FIG. 2, necessarily becomes more exaggerated in a sectional view of the battery. Extending from the periphery of the battery and formed in the course of the sealing procedures, is an outer border seal 26 formed of a plurality of frame-type sealing elements which extend inwardly from the border portion shown to select laminar elements of the battery. This lamination, as at 26, is relatively rigid, thereby contributing to the structural integrity of the flat battery configuration.

Figure 2:
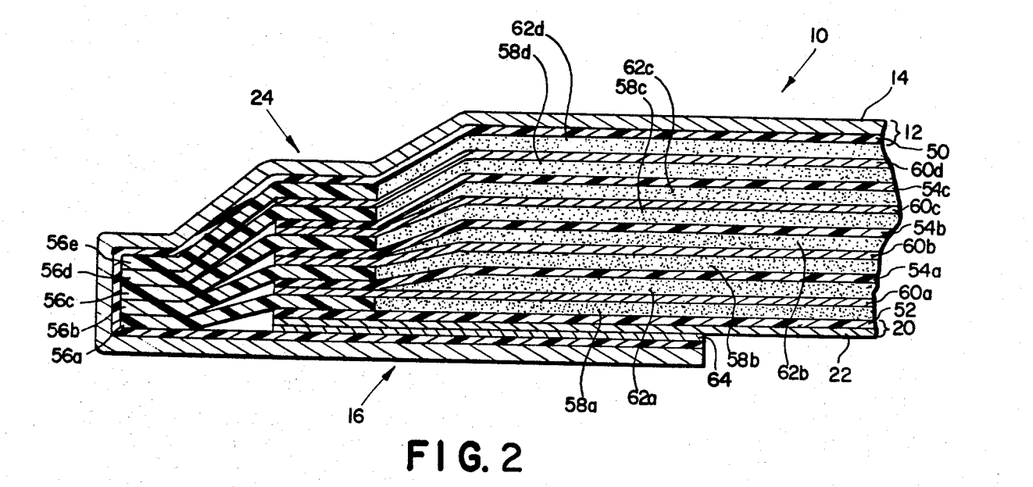
FIG. 2 is a sectional view of a battery structure according to the invention taken through the plane 2—2 of FIG. 1.
Figure 3:
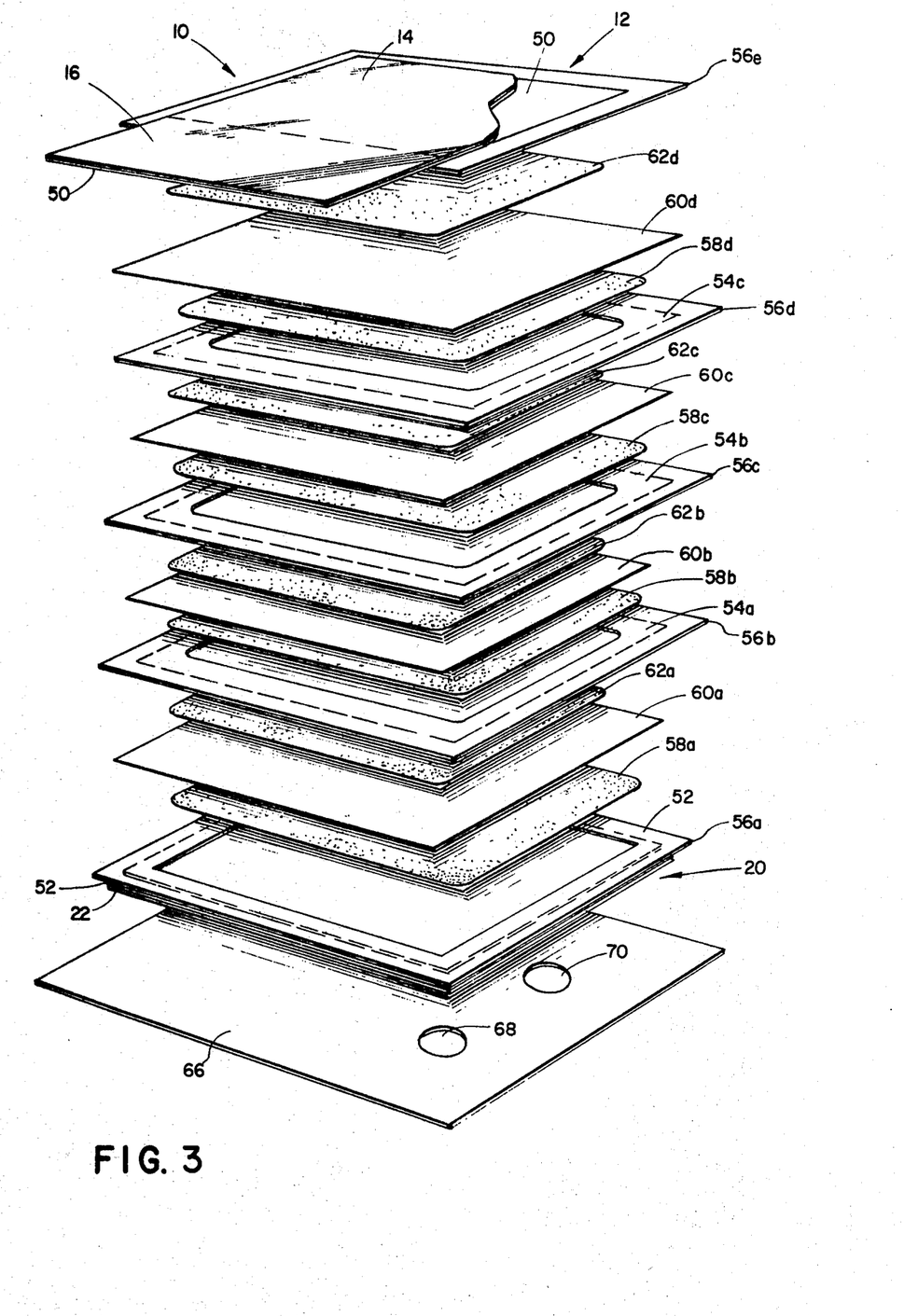
FIG. 3 is an exploded perspective representation of the components of a battery structure according to the invention, revealing the relative orientation of sheet-type components thereof.

Referring to FIGS. 2 and 3, the geometry and interrelationships of the discrete components forming battery pile 10 are revealed in detail. As described above, the exposed surfaces of the battery are present as an outer laminate of current collector assemblies 12 and 20. Prefabricated as discrete elements of the system, assemblies 12 and 20 are formed of a metallic sheet foil current collector which, in turn, is laminated to an internally disposed polymeric current collector. In this regard, assembly 12 is formed having a metallic surface current collector 14 serving as a terminal surface laminated with a polymeric current collector 50, while assembly 20 is formed having a metallic current collector outer terminal defining surface 22 laminated with polymeric current collector 52. Each of the metal current collectors 14 and 22 may be provided as an annealed tin coated steel sheet, preferably about 2 mils in thickness; however, they also may be formed of aluminum or lead sheet material of similar thickness for batteries intended for electronic photographic use. Polymeric current collectors 50 and 52 may comprise a non-conductive matrix, for instance, of a thermoplastic material so thoroughly impregnated with conductive particles, as of carbon, for example as to be effectively conductive. For example, the polymeric layers of the battery may be made from an electrically conductive carbon-impregnated vinyl film sold under the trademark "Condulon" having a thickness on the order of about 2 mils. for the instant application. As is apparent, the assemblies are prelaminated together prior to their assembly within the battery pile. Collector sheets 50 and 52 generally are impervious to electrolyte, are electrochemically inert and are characterized in exhibiting a low resistance to the flow of current from one face to the opposite face thereof. Accordingly, discrete sheets of this same material may be utilized for geometric cell definition and additionally as intercell connectors within a series build-up of cells forming a primary battery pile structure.

Considering the build-up of the pile structure, the battery 10 is seen to be formed of four serially associated cell units which are electrically associated but chemically isolated by intercell connectors 54a–54c. The intercell connectors preferably are formed as discrete rectangular sheets of electrically conductive carbon-impregnated vinyl film, as described earlier in connection with collector sheets 50 and 52, and, for the instant application having a thickness on the order of about 2 mils. The peripheral integrity of the entire pile structure is provided by a sequence of frame-shaped border seals designated generally at 56a–56e. Being mutually identically dimensioned, frames 56a–56e are formed having inner borders which define rectangular inner openings which mutually cooperate to form the peripheries of individual cell cavities. Additionally, each of the frames is dimensioned such that it extends beyond the periphery of an associated polymeric intercell connector 54a–54c as well as the polymeric surface portion 52 of assembly 20. As revealed in FIG. 3, the frame 56e extends outwardly from three edges of the assembly 12. As noted from the drawings, the frames 56a–56e are continuous and preferably are formed of a material heat sealable both along their commonly juxtaposed surfaces in the final pile structure as well as with polymeric collector sheets 50, 52 and 54a–54c. Material for the frames should be electrolyte impervious, remaining inert to the chemical activity of the battery structure. The frames 56a–56e may be formed of polyvinyl chloride having a thickness, for the present application, of about 5 mils. The thermal sealing of the inner border surface areas to a corresponding polymeric sheet, for instance, as at 52, may be carried out in impulse fashion wherein the temperature of the sealed portion is raised from room temperature to about 275° F. and returned to room temperature over an interval of about 15 seconds.

To form an initial one of the pile cell structures, an initial collector assembly, for instance, cathode collector assembly 20, may be preformed as a discrete assembly and a frame member 56a may be bonded thereto as described above. Over this subassembly is deposited, preferably by extrusion, a positive aqueous slurry which is present as a particulate dispersion of cathodic mix particles uniformly dispersed, preferably in combination with a dispersing agent, with aqueous electrolyte. In the preferred embodiment, the battery 10 incorporates a Leclanche electrochemical system, accordingly, the cathodic material will be present as a particulate dispersion of manganese dioxide and carbon dispersed within an aqueous solution of ammonium chloride, zinc chloride and, additionally, a small amount of mercuric chloride. The dispersant for the slurry is one selected to maintain a homogeneous character for the dispersion therewithin and will exhibit a high tolerance for salt as well as a stability from such effects as syneresis or the like. A particularly desirable characteristic for the dispersant is one which renders the slurry thixotropic, thereby considerably facilitating extrusion type deposition procedures.

Dispersants which may be incorporated within the slurries may be categorized as polymeric, synthetic resins or natural gums, included in amounts, generally less than one percent by weight of the electrolyte, selected to enhance cohesiveness and extrudability without substantially degrading the electrical properties of the slurry. In effect, the dispersion provides for adequate interparticulate contact to assure electrical conductivity while, at the same time, providing a maximum exposure of particulate surface area to ion conduction as derived from the electrolyte component of the slurry. As examples of polymeric dispersing agents effective for the development of the slurries of the invention, mention may be made of methylcellulose (sold under the tradename "Methocel 4000" by Dow Chemical Co., Midland Mich.), poly-ethylene oxide (sold under the tradename "Polyox" by Union Carbide Corp., N.Y., N.Y.), hydroxyethyl cellulose (sold under the tradename "Klucel" by Hercules Inc., Wilmington, Del.) heteropolysaccharide (anionic) (sold under the tradename "Xanthan Gum" by General Mills Corp., Minneapolis, Minn.), and poly-2-acrylamido-2-methylpropane sulfonic acid. A natural gum dispersing agent which may be utilized with the slurry system of the invention may be, for example, guar gum derivative (sold under the tradename "Jaguar" by Stein, Hall & Co., N.Y., N.Y.).

The essential characteristic of cathode slurries in accordance with the invention is the inclusion of not more than about 30 percent, nor less than about 23 percent, of water, based on the weight of slurry. Preferably, the water content is from 26 to 28 percent by weight. Smaller amounts of water produce a mix that cannot be easily or uniformly extruded, does not form a cohesive layer in the battery, and generally lead to low yields and poor shelf life and performance. About 30 percent by weight of water is the most that can be included before separation of the liquid from the slurry is encountered, causing leakage and poor seals which greatly reduce both yields and the shelf lives of the survivors. The conditions in this regard are much different from those encountered in flat Leclanche cells designed for operation under pressure, as in the above cited Soltis patent; in cylindrical Leclanche or alkaline cells, which again are basically pressurized systems; in cells designed for operation at very low temperatures; or in zinc chloride cells.

In *Batteries, Volume* 1, *Manganese Dioxide,* edited by Karl V. Kordesch and published by Marcel Dekker, Inc., New York, N.Y. in 1974, on page 155, various cathode mix compositions for various current drain conditions in cylindrical D cells are given. These range in water content from about 10 to about 16 percent, based on the weight of mix. Alkaline cells are discussed in chapter 2 of the same book; since the chemistry is quite different, notably in that alkaline cells are anode dependent, whereas Leclanche cells are cathode dependent; and in that Leclanche cells are acidic in pH, whereas the alkaline cells have a very high pH; analogies cannot readily be made. Very low temperature cells are described, for example, in U.S. Pat. No. 3,060,256, issued on Oct. 23, 1962 to J. W. Paulson for Low Temperature Dry Cell. In this patent, the inclusion of lithium chloride in the electrolyte, together with a moisture content as high as 36 percent by weight, are recommended. Such a formulation could not be used for the purposes of this invention, because of the separation and leakage problems described above. Zinc chloride cells are described in the above cited book, *Batteries,* on pages 213–215 and elsewhere, and a particular example containing 25.6 percent of water in the cathode mix is described in U.S. Pat. No. 3,888,699, issued on June 10, 1975 to Lewis F. Urry for Primary Dry Cell. These cells are not analogous to Leclanche cells, particularly where water content is concerned, because the chemistry is quite different. In particular, as set out on pages 214 and 215 of *Batteries,* supra, in the zinc chloride cell 9 moles of water are consumed for each 8 moles of $MnO_2$ reduced, whereas there is no water loss in the overall reaction of the Leclanche cell. Moreover, the high impedance of zinc chloride solutions would make their use utterly impractical where very high current drains are needed.

The deposited positive aqueous slurries are represented in the drawings at 58a–58d. Note that the slurry as at 58a is deposited over the surface of polymeric collector 52 and corresponding cathodic slurries 58b–58d are located for contact with an upwardly extending surface of an appropriate intercell connector sheet 54a–54c. With this arrangement, the contacting polymeric surface serves as a current collector for the associated positive electrode structure.

Figure 4:
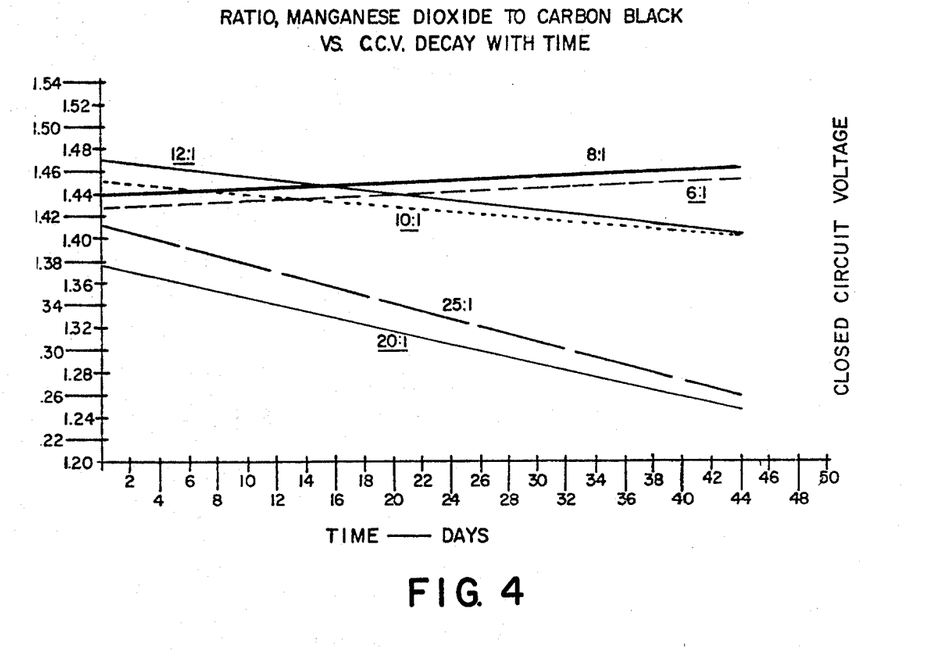
FIG. 4 is a chart comprising a family of curves showing the shelf life characteristics of single primary cells with slurry cathodes of varying manganese dioxide to carbon ratios.

It has been determined that for slurry cathode electrode systems according to the invention, the ratio by weight of manganese dioxide to carbon within the slurry may be optimized. The curves of FIG. 4 provide an indication of shelf life versus closed circuit voltage performance of cathode slurry unit cells formed having varying ratios of manganese dioxide to carbon content. Each curve is labeled with that ratio with which the unit cells deriving it were fabricated. For some structures, significantly improved shelf life performance may be achieved with ratios between about 6:1 and 12:1. However, within this range, the most preferred ratio for achieving improved shelf life for the cells is 8:1.

Upon deposition, as by extrusion, of cathodic slurry 58a, a selectively dimensioned sheet of battery separator material 60a is positioned thereover. This material is selected as being wettable by the slurry depositions with which it is in contact as well as being ionically permeable. Additionally, the material should exhibit a texture or porocity, the intersititial openings or channels of which are of adequately fine geometry or size to assure that no migration of the particulate matter of the slurries from one electrode environment to another may occur. Among the materials conventionally used as separators, mention may be made of fibers and cellulosic materials, woven or nonwoven fibrous material such as polyester, nylon, polypropylene, polyethylene or glass. Specifically, a Kraft paper having a thickness of about 2.0 mils. has been found to be adequate for the purpose of the instant application. Except as noted, cells and batteries made as described in the specific examples described below used such Kraft paper separators.

However, the best material for this purpose presently appears to be cellophane free of humectants or plasticizers, as described in more detail in U.S. Application for Letters Patent Ser. No. 684,370, filed on May 7, 1976 by Edwin H. Land for Electrical Cells and batteries and assigned to the assignee of the application.

As shown in FIGS. 2 and 3, separator 60a as well as separators 60b–60d are dimensioned as having the same peripheral shape and size as polymeric collector 20 or intercell connectors 54a–54c. In this regard, note that the separators are dimensioned such that their peripheries extend over the inner rectangular openings defined by the inner borders of frames 56a–56e.

The associated anode for the initial cell of the pile structure illustrated is represented by a slurry deposited over one surface of intercell connector 54a opposite and generally coextensive with the deposition of cathodic slurry 58a. As in the case of the cathode slurries, the anode slurry as at 62a may be deposited utilizing positive displacement techniques, doctoring, silk screening or the like, however, considerable manufacturing advantage may be achieved inasmuch as the slurry is of a consistency permitting its deposition by extrusion.

Negative electrode slurries 62a–62d comprise a particulate dispersion of metallic anode particles disposed as in the case of the positive slurry, as a substantially uniform dispersion within aqueous electrolyte. For a Leclanche system, zinc particles are utilized as the active material and are present in a concentration per unit area effective to provide an electrically conductive dispersion thereof, while the electrolyte is present in intimate surface contact with the particles in a concentration rendering the slurry ionically conductive. A zinc particle size of, for example, about eight microns mean diameter may be utilized with the slurry. The dispersing agent utilized for the slurry may be selected to enhance deposition thereof. Those dispersing agents described above in connection with the formation of the positive slurry electrode may be utilized for forming the negative slurry electrode.

The essential characteristic extrudability and coherance of anode slurries in accordance with the invention are dependent on the amount of water included in the mix. When the object is to form a smooth adherent layer on a conductive plastic substrate by extrusion, silk screening or the like, while achieving minimum impedance, conventional techniques used in forming powdered zinc electrodes are not satisfactory. It is highly undesirable for this purpose to form the electrode with substantial proportions of a gelling agent, as has been done in alkaline cells, for example, because the impedance would be too high. Methods based on placing the zinc powder in a pouch or envelope, as in the above cited patent to Soltis, are inapplicable because no mechanism is available in the laminar battery to hold the powder in place during assembly. In slurries formed with solutions of Leclanche electrolytes, zinc tends either to cake up and form a crumbly mass that is not adherent to the substrate, or to separate out of the liquid. A small amount of a water soluble polymeric suspending agent, such as carboxymethyl cellulose, hydroxyethyl cellulose or the like, is of material assistance in keeping the zinc powder in suspension. On the other hand, the zinc and ammonium chlorides appear to act in opposition to the suspending agent in this respect. It has been found that with an electrolyte solution of typical low impedance concentrations of zinc chloride and amonium chloride, in which ammonium chloride predominates, somewhat larger quantities of liquid, and consequently of water, may be needed than in the cathode slurries. In particular, amounts of from 25 to 40 percent of water, and preferably about 26 to 36 percent, of water, based on the weight of anode slurry, produce mixes of good extrudability and reasonable stability. Mercuric chloride is usually included in the electrolyte solution used in preparing the zinc slurry composition. In the completed battery, zinc soon replaces the mercury, which effects an amalgamation of surface portions of the zinc particles. All zinc slurries should be used soon after they are prepared; standing overnight, for example, will usually produce settling, caking or gassing.

The first cell build-up is completed with the positioning in registry of intercell connector 54a over negative slurry deposition 62a. Intercell connector 54a is formed, as described above, incorporating a border sealing frame 56b, the inner surface portion of which is thermally bonded to the outwardly disposed surface of the intercell connector sheet. Upon being so positioned to define the cell, the outer peripheral border surface portions of frame 56b are thermally bonded with the corresponding outer surface portion of frame 56a. In addition to serving as an intercell connector, sheet 54a also serves as the current collector for the negative electrode of the initial cell. Note that within the initial cell, separator 60a extends not only sufficiently to separate the electrode slurries 58a and 62a but also is configured to provide electrical separation of current collector sheets 52 and 54a and to extend over the thermal bonding surface between each frame member and its associated current collector sheet. With this arrangement, no inadvertent shorting effects or the like are likely to arise. Further, such geometry assures that no migration of the particulate dispersion of one electrode slurry into the opposite electrode slurry occurs.

For production of a battery unit having a single cell construction, cathode slurry material 58a is deposited on current collector assembly 20 as described above. Separator sheet 60a then is positioned over the slurry following which anode slurry material is deposited upon the surface of polymeric current collector 50 of current collector assembly 12. Border frames 56a and 56e then are heat sealed together to complete the cell. This sealing may be carried out by the above-noted impulse thermal bonding technique.

To provide the multicellular pile structure, for instance, having four cells as illustrated in the drawings, the pile build-up is carried out in a sequence next to be described. In particular, the initial cell is fabricated as above by depositing cathode slurry 58a following which separator 60a is positioned over in appropriate registry with polymeric collector 52. Anode slurry material 62a then is deposited upon one surface of intercell connector 54a and the connector 54a as well as previously attached frame 56b is joined with collector assembly 20 and thermally bonded thereto at the adjoining surfaces of frames 56a and 56b. Cathode slurry material as at 58b then is deposited on one side of a next separator sheet 60b and the sub-assembly is placed in appropriate registry upon the opposite side of polymeric intercell connector 54a. Anode slurry composition then is deposited upon one side of another polymeric intercell connector 54b. Intercell connector 54b, including previously attached frame 56c then is placed over the sub-assembly including separator 60b following which frame 56c is thermally bonded with frame 56b. This procedure essentially is reiterated until the entire pile structure including anode current collector assembly 12 is attached. Following desired final thermal bonding of the entire stached array of cells, extended portion 16 of collector assembly 12 is covered with an insulative tape 64 and wrapped around to the underside of the battery to provide for juxtaposed terminal defining surfaces. The battery assembly may then be mounted upon a supporting card as at 66 having apertures 68 and 70 preformed therein to provide access to the noted terminal defining surfaces.

The process of the invention just described will next be more fully described with reference to FIGS. 5 through 14.

Figure 5:
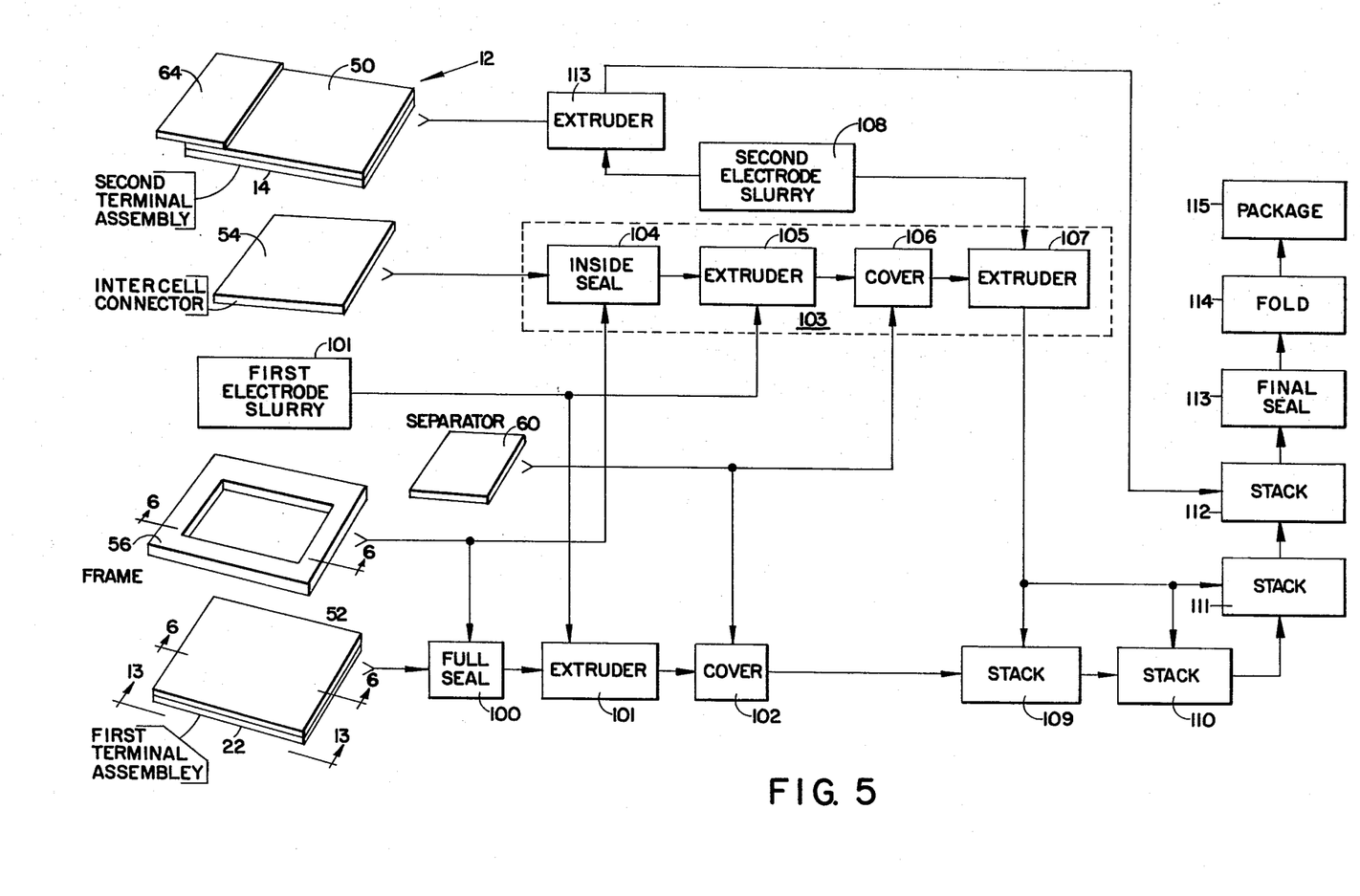
FIG. 5 is a schematic block and flow diagram illustrating components and processes schematically drawn to show the manner in which thin, flat laminar batteries are made in accordance with the invention.

FIG. 5 shows in a schematic fashion the several components of the battery described above in their relation to a manufacturing and assembly process in accordance with the invention illustrated in block diagram form.

The process may be considered as divided into three sub-processes, each of which results in the manufacture of a sub-assembly, which sub-assemblies are then assembled to make the completed battery. As indicated above, the first sub-assembly comprises, as starting material, the metal terminal 22 to which is laminated the conductive plastic current collector sheet 52.

Figure 6:
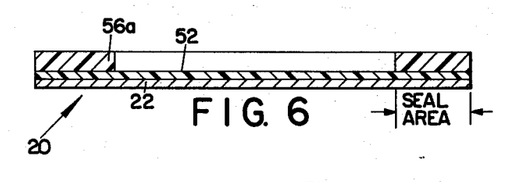
FIGS. 6, 7 and 8 are a series of schematic cross-sectional elevational sketches, taken essentially along lines such as 6—6 in FIG. 5 but on an enlarged scale, illustrating sequential steps in process of making a first sub-assembly in accordance with the invention.

As illustrated in FIGS. 5 and 6, the first terminal assembly comprising the sheets 22 and 52 are bonded to a first frame 56a of a series of the frames 56 described above in a sealing station indicated schematically at 100 in FIG. 5, so that the conductive plastic sheet 52 is bonded to the whole surface of the frame 56a over the area indicated schematically in FIG. 6.

Figure 7:
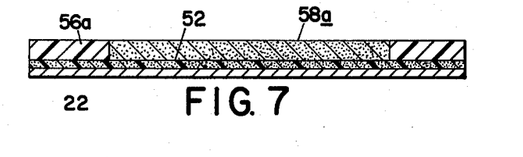

A supply of the first electrode slurry, comprising the material for making up the cathode slurries 58 in the particular embodiment here described, is schematically illustrated as disposed in a container 101 for distribution to various extruders to be described, including in particular a first extruder 101. At the extruder station 101, the first cathode slurry deposit 58a is deposited within the opening in the frame 56a and over the surface of the conductive plastic collector sheet 52 as shown in FIG. 7. The extruder 101, and other such devices to be described, may be any conventional apparatus known in the art for this purpose. In a hand process, the slurry could simply be deposited with a spatula using the frame 56 as a mask.

Figure 8:
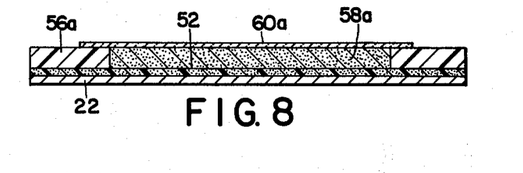

The sub-assembly illustrated in FIG. 7 produced at the extruder 101 is next transfered to a station at which the first of the separators 60, and particularly separator 60a is placed over the frame 56a and in contact with the slurry patch 58a as shown in FIG. 8. The structure of FIG. 8 comprises the first sub-assembly discussed above.

Figure 9:
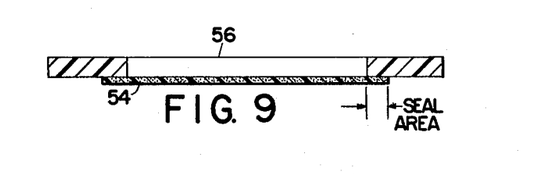
FIGS. 9, 10, 11 and 12 are schematic cross-sectional elevational sketches, again taken along lines such as 6—6 in FIG. 5 and illustrating steps in the process of making a second series of sub-assemblies in accordance with the invention.

The manufacture of a second series of sub-assemblies is carried out in process apparatus indicated generally at 103 in FIG. 5. At a first station 104 in the apparatus 103, one of the intercell connectors 54 is sealed to one of the frames 56 over a portion of the inner periphery of the frame 56 as shown in FIG. 9. This process is carried out by the application of heat and pressure in a conventional fashion either by any conventional automatic processing apparatus or by hand, with the aid of a suitable manually operated heated press.

Figures 10, 11:
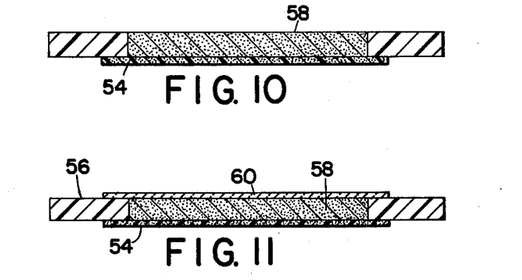

Comparing FIGS. 5, 9 and 10, the framed intercell connector 54 of FIG. 9 is transfered from the sealing apparatus 104 to an extruder 105 of any variety described above, in which a slurry deposit from the first slurry electrode supply 101 is deposited as indicated at 58 in FIG. 10. As suggested at 106 in FIG. 5, this assembly is then covered with one of the separators 60 to produce the sub-assembly shown in FIG. 11. The separator 60 will become wet by the slurry 58 when this operation is performed, assisting it in adhering to the cathode slurry 58. If the separators 60 are made of a conventional porous material, having their edges filled with liquid impermeable thermoplastic adhesive material, as described, for example, in U.S. Pat. No. 3,708,349, issued on Jan. 2, 1973 to William R. McCauley et al, for Method of Constructing Multicell Batteries, the separator 60 may be sealed under heat and pressure to the frames 56 at this stage. This operation is actually not essential, however, because the peripheral seal is entirely completed through the frames 56.

Figure 12:
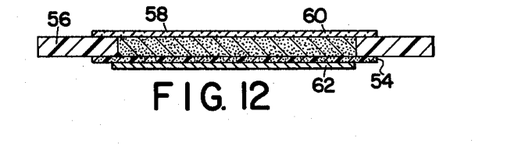

Referring now to FIGS. 5 and 11, as the next stage in the operation the assembly from the covering stage 106 is transmitted to an extruder 107 of the kind described above, where a slurry anode deposit 62, shown in FIG. 12, is applied from a supply of second electrode slurry 108 indicated in FIG. 5. This operation completes the second sub-assembly, of which three are required for a four cell battery.

It will be apparent that because the apparatus 103 is required to produce three sub-assemblies for each sub-assembly produced from the cover stage 102, for high speed production as many lines 103 would be desirable as there were sub-assemblies of the second kind to be made. In particular, for four cell battery, three such lines 103 would be desirable. However, this feature has not been illustrated as it would sufficiently apparent from the description given and would unduly complicate the drawings.

Figure 13:
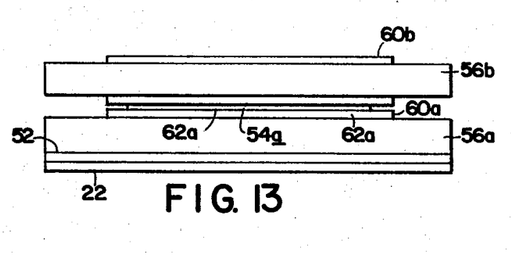
FIGS. 13 and 14 comprise schematic elevational sketches, taken essentially along lines such as 13—13 in FIG. 5 illustrating two stages in the process of manufacturing batteries in accordance with the invention.

Comparing FIGS. 5, 8, 12 and 13 as the next step in the process of assembly, one of the sub-assemblies of FIG. 12 from the extruder 107 is stacked on top of the sub-assembly of FIG. 8 from the cover operation 102 at a station indicated schematically at 109 in FIG. 5. The result is as shown in FIG. 13. This operation simply comprises placing frames 56a and 56b in registry and bringing the components together.

Figure 14:
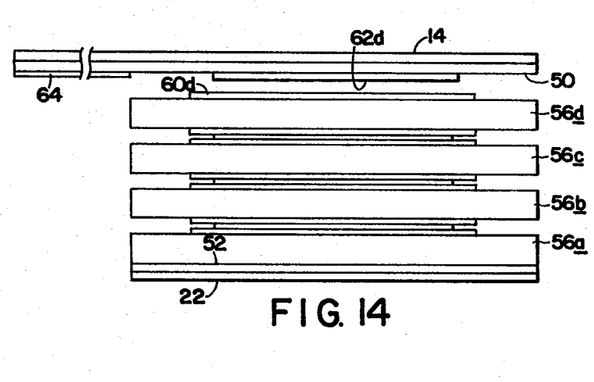

This stacking operation is reiterated, as suggested at 110, 111, and 112 in FIG. 5, until each of the three sub-assemblies comprising the frames 56b, 56c, and 56d are in place as illustrated in FIG. 14.

Manufacture of the third sub-assembly begins with the second terminal assembly 12 described above. As illustrated in FIG. 5, the plastic insulator sheet 64 may be heat sealed to the conductive plastic sheet 50 as a preliminary step, or it may be added later as described above.

The second terminal assembly 12 is provided with a second anode slurry patch 62d from the supply of second electrode slurry material 108 in an extruder 113 to produce a sub-assembly shown in FIG. 14 that is stacked with the other components of the battery as suggested at 112 in FIG. 5 and shown partly completed in FIG. 14. The assembled stack is then passed to a final seal operation as indicated at 113 at which the seals are completed around the entire periphery of the battery as described above.

As suggested at 114, the anode terminal may be folded over to bring the insulating sheet 64 into the position shown in FIG. 2, and the final packaging can be completed as suggested at 115 in FIG. 5 and described in more detail above.

Figure 15:
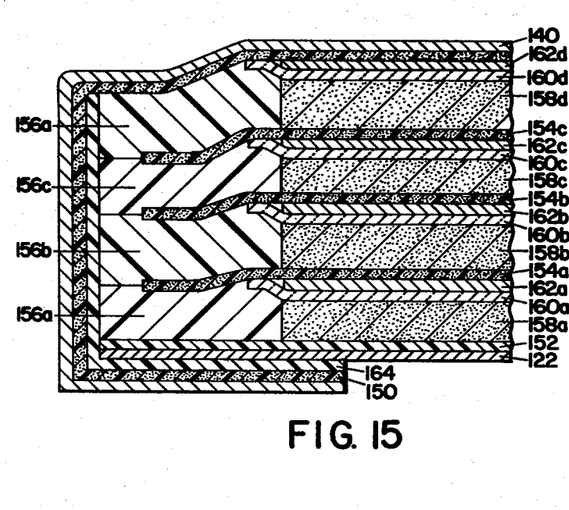
FIG. 15 is a schematic fragmentary cross-sectional elevational sketch, on an enlarged scale, illustrating a portion of a completed battery made in accordance with a modification of the invention.

FIG. 15 shows a portion of a completed battery in accordance with the modification of the invention particularly adapted for use with cellophane separators. The process of FIGS. 5 through 14 may be employed to produce this battery, the primary difference being in the relative sizes of the separators and the intercell connectors.

In FIG. 15, parts are given reference characters corresponding to parts with similar function in FIG. 2, with 100 added to the suffix. For example, the frames are numbered 156a through 156d, rather than 56a through 56d. One exception to the numbering scheme just mentioned is that the outer terminal steel 140 corresponds to the terminal 14 in FIG. 2.

One presently preferred material for the frames 156a through 156d is Versalon TPX 1140, a polyamide resin made by General Mills Corp. of Minneapolis, Minn. These frames may be 18 mils thick in a particular embodiment of the invention, designed to incorporate relatively thick cathode slurry layers 158a through 158d.

The separators 160a through 160d in FIG. 15 are made smaller than the intercell connectors 154a through 154c. When the separators 160 are made of cellophane, this construction is preferred because the cellophane becomes wet by the slurry and is not readily bonded to the other elements in the battery. Thus, the intercell connectors 154 are carried out beyond the separators so that they can participate in the seal formed between the frames 156. In this manner, the integrity of the seal may be considerably improved.

Various modifications may be made in the process in FIG. 5 without departing from the scope of the invention. For example, sub-assemblies from the extruder 107 can be stacked before adding the sub-assembly from the covering up stage 102. Other alternatives of this kind will be apparent to the artisan and need not be described in detail.

As noted above, batteries constructed in accordance with the invention are characterized in exhibiting improved current drain capacities in addition to being structured to permit the utilization of more efficient high volume techniques for their manufacture inasmuch as the electrode slurries may be extrusion deposited. One technique for evaluating the effectiveness of the flat battery structures for the noted photographic application is to test certain batteries or unit cells selected from manufactured lots thereof by pulsing them repeatedly through a predetermined load for a given pulse interval and providing a predetermined rest period intermediate the pulses. The instant slurry electrode battery system may be evaluated under such a testing technique by forming unit cells wherein one select electrode thereof is formed as a slurry system, while the oppositely disposed electrode is formed under more conventional "dry patch" technique as is generally described, for instance, in U.S. Pat. No. 3,770,504. Such dry patch electrodes are formed, for instance, in the case of the anode electrode by predepositing anode material in the form of powdered zinc within an aqueous binder solution which, subsequent to deposition, is removed by heat induced vaporization or the like.

A typical dry patch anode composition, and that used in the preparation of those exemplary batteries to be described below in which dry patch anodes were employed, is given below:

| powdered zinc | 1000 | gm. |
| carbon black | 5 | gm. |
| Polytex 6510 | 39.1 | gm. |

-continued

| | | |
|---|---|---|
| Bentone LT | 0.62 | gm. |
| tetra-sodium pyro phosphate | 0.25 | gm. |
| water | 150 | gm. |

In the above composition, Polytex 6510 is an acrylic emulsion resin as sold by Celanese Corporation, of Newark, N.J. Bentone LT is an organic derivative of hydrons magnesium aluminum silicate, as sold by National Lead Co., of New York, N.Y. The ingredients are blended to form a smooth dispersion, then deposited by silk screening, extrusion, or the like and heated to dryness. In the batteries described, the anode dispersions were coated over an area of about $1\frac{7}{8} \times 2\frac{1}{2}$ inches to a dry weight of about 0.52 gm.

Similarly, manganese dioxide-carbon cathode dry patch may be formed upon a current collector material utilizing an aqueous solution incorporating a butyl rubber or the like as a binder. The aqueous phase of the solution is removed subsequent to deposition by heat induced vaporization.

A typical dry patch cathode formulation, and that employed in those exemplary batteries to be described below in which dry patch cathodes were employed, is given below:

| | | |
|---|---|---|
| particulate magnesium dioxide | 1000 | gm. |
| Shawinegan black (a carbon black sold by Shawinegan Products Corp., N.Y., N.Y.) | 40 | gm. |
| BP-100 (a latex sold by Exxon Chemical Co., Houston, Texas) | 67.68 | gm. |
| Ethylene diamine tetra-acetic acid | 4.12 | gm. |
| tetrasodium pyrophosphate | 10 | gm. |
| Lomar D | 3.85 | gm. |
| Water | In sufficient quantity for deposition | |

In the above formulation, Shawinegan black is a carbon black sold by Shawinegan Products Corp., of New York, N.Y. BP-100 is a latex sold by Exxon Chemical Co. of Houston, Tex.. Lomar D is a dispersing agent sold by Nopco Chemical Co. of Newark, N.J . The above ingredients were blended to form an extrudable dispersion, then laid down on a substrate and heated to dryness. The cathode patch area is the same as the anode patch area; each dried patch weighed about 1.35 grams.

During the assembly of a battery including dry patch anodes or cathodes, the dry patch is coated with about 0.5 gm of a gel electrolyte of the following composition:

| | | |
|---|---|---|
| water | 923 | cc |
| ammonium chloride | 326.6 | gm. |
| mercuric chloride | 32.66 | gm. |
| zinc chloride | 246 | gm. |
| hydroxyethyl cellulose | 49.9 | gm. |

The improved current capacity of flat Leclanche cells fabricated according to the slurry system of the invention as compared with the noted dry patch cell may be demonstrated by the following comparative data. Battery cells were fabricated utilizing collector assemblies, separators and seals substantially as described in connection with FIG. 1, 2 and 3, however, only single cell units utilizing two collector assemblies were formed. These cells were provided having electrochemically active dimensions, i.e., current collector size, of about 3 inches long and $2\frac{1}{2}$ inches wide. Testing was carried out by pulsing the cells as above described through a 1 ohm load for 1.1 seconds and utilizing a 3 second rest interval after each pulse. Test results were recorded as the number of such pulses delivered by the cell under test before reaching 1.0 volts, divided by the weight of $MnO_2$ in the cathode in grams to make a more accurate comparison between cells with similar but slightly different amounts of the controlling cathode material. Dry patch type control cells delivered from 81 to 115 pulses per gram before reaching 1.0 volts. By comparison, single cells having the equivalent of electrode material as the control cells but utilizing anode electrodes formed as a slurry according to the invention were similarly tested. The anode electrodes of the cells were provided as aqueous slurries, these slurries having been prepared from the following formulation:

EXAMPLE I

| | Weight | | Wt. % |
|---|---|---|---|
| Methocel 4000 | 2 | gm. | 0.33 |
| ammonium chloride | 68 | gm. | 11.24 |
| zinc chloride | 30.9 | gm. | 5.11 |
| mercuric chloride | 5.9 | gm. | 0.98 |
| powdered zinc | 300 | gm. | 49.60 |
| water | 198 | ml. | 32.74 |
| | | | 100.0 |

In the above formulation, Methocel 4000 is carboxymethyl cellulose, as sold by Dow Chemical Co. of Midland, Mich.

When pulsed as above described, the cells containing an anode slurry electrode of the composition of Example I delivered between 148 and 172 pulses per gram before reaching 1.0 volts.

Similarly, unit cells having cathode electrodes formed as a slurry and anode electrodes in dry patch conventional form were prepared. The amount of material in the electrodes remained substantially the same as the control, however, the manganese dioxide-carbon ratio within the cathode electrode was altered from 25:1 to 8:1. The aqueous slurry cathodes were prepared from the following formulation:

EXAMPLE II

| | Weight | | Wt. % |
|---|---|---|---|
| ammonium chloride | 33 | gm. | 8.66 |
| zinc chloride | 15 | gm. | 3.94 |
| mercuric chloride | 3 | gm. | 0.79 |
| poly-2-acrylamido-2-methylpropane sulfonic acid | 6 | gm. | 1.58 |
| carbon black | 25 | gm. | 6.56 |
| manganese dioxide | 200 | gm. | 52.49 |
| water | 99 | ml. | 25.98 |
| | | | 100.0 |

When pulsed as above described, the cells exhibited a pulse capacity ranging from 280 to 294 pulses per gram of $MnO_2$.

Other single cells were made and tested in the manner described above, using anode slurries having the composition illustrated by Example III below. In each case, the test results given are the averages for at least three cells, and in most instances of five cells.

EXAMPLE III

An electrolyte solution was prepared by stirring 10 grams of Methocel 4000, 340 grams of $NH_4Cl_2$, 154.5 grams of $ZnCl_2$ and 29.5 grams of $HgCl_2$ into 990 C.C. of water. To 100 grams of this solution were slowly added 150 grams of zinc powder, while stirring with a Teflon stirrer under a blanket of nitrogen. The mix was blended by stirring under the nitrogen blanket for one hour, forming a smooth, paintlike extrudable or screenable slurry. This slurry had the following composition, given as percent by weight based on the total weight of slurry:

| | |
|---|---|
| Zn | 60.00 |
| $H_2O$ | 25.98 |
| Carboxymethyl cellulose | 0.26 |
| $HgCl_2$ | 0.78 |
| $NH_4Cl$ | 8.92 |
| $ZnCl_2$ | 4.06 |
| | 100.0 |

When pulsed as described above, cells including the anode slurries of Example III delivered an average of 160 pulses per gram before reaching 1.0 volts.

EXAMPLE IV

Seventy grams of a 7.29 percent by weight solution of HCl in water was stirred into 100 grams of zinc dust until a homogeneous mixture was obtained. Twenty grams of $NH_4Cl_2$, 1.3 grams of $HgCl_2$ and 4.0 grams of Jaguar gum, identified above, were mixed together and then stirred into the zinc dispersion to form a slurry of good extrudability and of the following composition, given in percent by weight based on the total weight of slurry:

| | |
|---|---|
| Zn | 50.03 |
| $H_2O$ | 31.70 |
| $NH_4Cl$ | 10.49 |
| $HgCl_2$ | 0.68 |
| Jaguar gum | 2.10 |
| $ZnCl_2$ | 5.00 |
| | 100.0 |

Cells made in the manner described above but using the slurry of Example IV above, delivered an average of 154 pulses per gram before reaching 1.0 volts.

EXAMPLE V 2.6 grams of $HgCl_2$ and 13.2 grams of $NH_4Cl$ were dissolved in 40 grams of a 2 percent by weight solution of carboxymethyl cellulose in water. 6.0 grams of $ZnCl_2$ and 200 grams of zinc dust were blended together, and the solution was added with stirring until a uniform slurry of excellent working properties was formed. This slurry had the following composition, given in percent by weight based on the weight of slurry:

| | |
|---|---|
| Zn | 76.4 |
| $H_2O$ | 15.0 |
| $NH_4Cl$ | 5.0 |
| $HgCl_2$ | 1.0 |
| $ZnCl_2$ | 2.3 |
| Carboxymethyl cellulose | 0.3 |
| | 100.0 |

Cells made as described above but using the anode slurry of Example V delivered an average of 144 pulses per gram before reaching 1.0 volts.

EXAMPLE VI 60 grams of an 8.01 percent by weight solution of HCl in water was stirred into 100 grams of zinc dust for one hour under a nitrogen blanket and allowed to stand overnight. 1.3 grams of $HgCl_2$, 17.2 grams of $NH_4Cl$ and 1.6 grams of hydroxyethyl cellulose were mixed together and sifted into the zinc dispersion, then stirred for one hour to form a slurry of the following composition, in weight percent based on the weight of slurry;

| | |
|---|---|
| Zn | 54.40 |
| $H_2O$ | 30.31 |
| $ZnCl_2$ | 4.36 |
| $NH_4Cl$ | 9.36 |
| $HgCl_2$ | 0.71 |
| hydroxyethyl cellulose | 0.87 |
| | 100.0 |

Single cells made as described above but using the slurry of Example VI delivered an average of 190 pulses per gram of $MnO_2$ before reaching 1.0 volts.

EXAMPLE VII 70 grams of water were stirred into 100 grams of zinc dust. 10 grams of concentrated hydrochloric acid were added dropwise with stirring. The mixture was allowed to stand for 24 hours. 22 grams of $NH_4Cl_2$, 1.3 grams of $HgCl_2$ and 2.0 grams of hydroxyethyl cellulose were added and the mixture stirred to form a slurry of the following composition, in weight percent based on the weight of slurry:

| | |
|---|---|
| Zn | 47.1 |
| $H_2O$ | 37.2 |
| $ZnCl_2$ | 3.4 |
| $NH_4Cl$ | 10.7 |
| $HgCl_2$ | 0.6 |
| hydroxyethyl cellulose | 1.0 |
| | 100.0 |

Single cells prepared as described above but using the anode slurry of Example VII delivered an average of 147 pulses per gram before reaching 1.0 volts.

Current densities required to charge an electronic flash unit having an output energy of 40 watt seconds are considerably higher than those involved in the pulse tests described above, using batteries of the same electrode areas. Test apparatus for evaluating electronic flash capability was made in the form of a Polaroid SX-70 Land camera fitted with a nominally 40 watt second flash unit and wired to operate the electronic shutter and the film processing motor of the camera in synchronism with the flash unit, using the battery under test in a test fixture to power both the camera and the flash unit. A cycle of test operation consisted of charging the flash unit until a ready light indicating the state of charge of the flash unit glowed, then disconnecting the battery from the flash unit, but not from the motor, and substantially simultaneously starting the camera cycle. During the camera cycle, which lasted approximately 1.1 seconds, the shutter solenoid was energized, the flash unit was triggered, and thereafter the processing motor ran to simulate a film processing operation. After the battery was disconnected, a thirty second rest interval was provided before the next cycle. The tests to be described were streamlined by placing the battery under tests in an external test fixture, and operating the camera without film, as it had been found to make little difference in the results whether or not film was actually processed. Charging time for each cycle was measured with a stop watch, and recorded for ten cycles, or for as many cycles as the battery would carry out. Each such cycle required from 80 to 90 watt seconds for the flash unit, and 8 or 9 watt seconds for the camera, or from about 90 to 100 watt seconds per cycle total energy.

A standard production battery of the kind sold in Polaroid SX-70 film packs, including dry patch anodes and cathodes as described above, was tested by the method described above in comparison with two other batteries of essentially the same construction but with heavier cathodes. One of these had cathode patches weighing from 2.5 to 3 grams, and the other had cathode patches weighing 4 grams each. The test results were as set out in Table I below:

TABLE I

| | CATHODE WEIGHT, GRAMS | | | | | |
|---|---|---|---|---|---|---|
| | 1.35 | | 2.5 to 3.0 | | 4.0 | |
| CYCLE | $\Delta t$ | S | $\Delta t$ | S | $\Delta t$ | S |
| 1 | 5.2 | 5.2 | 4.8 | 4.8 | 5.6 | 5.6 |
| 2 | 6.2 | 11.4 | 5.4 | 10.2 | 6.0 | 11.6 |
| 3 | 7.0 | 18.4 | 6.2 | 16.4 | 6.8 | 18.4 |
| 4 | 8.6 | 27.0 | 7.0 | 23.4 | 7.6 | 26.0 |
| 5 | 10.0 | 37.0 | 8.0 | 31.4 | 8.4 | 34.4 |
| 6 | 12.6 | 49.6 | 8.4 | 39.8 | 9.2 | 43.6 |
| 7 | 16.8 | 66.4 | 9.2 | 49.0 | 10.2 | 53.8 |
| 8 | 27.4 | 93.8 | 10.0 | 59.0 | 11.4 | 65.2 |
| 9 | 67.0 | 160.8 | 10.8 | 69.8 | 12.8 | 78.0 |
| 10 | Failed | | 13.2 | 83.0 | 14.8 | 92.8 |
| 11 | | | 16.4 | 99.4 | 17.8 | 110.6 |
| 12 | | | 20.4 | 119.8 | 18.6 | 129.2 |
| 13 | | | 26.0 | 145.8 | 23.8 | 153.0 |
| 14 | | | 40.0 | 185.8 | 30.8 | 183.8 |
| 15 | | | Failed | | 42.2 | 226.0 |
| 16 | | | | | Failed | |

In the above table, $\Delta t$ is the charge time in seconds for each cycle, and S is the cumulative total charge time. As indicated by the fact that it carried out 15 cycles before failure, and as would be expected, the battery with the 4 gram cathodes had more energy capacity than the battery with 2.5 to 3 gram cathodes. However, the latter gave shorter recharge times up through the 11th cycle, and a shorter total time through the 13th cycle. For a photographic system in which ten cycles are expected, these shorter times are clearly preferable to more ultimate capacity.

Seven four-cell batteries including slurry electrodes were evaluated with the electronic flash and camera test described above, using cathode slurries of the composition illustrated by Example VIII below, and the anode composition illustrated by Example IX below.

EXAMPLE VIII

Sixty grams of a ten percent by weight solution of poly-2-acrylamido-2-methylpropane sulfonic acid in water, 33 grams of ammonium chloride, 3 grams of mercuric chloride, and 15 grams of zinc chloride were dissolved in 40 ml. of water. Twenty-five grams of Shawinegan black and 200 grams of manganese dioxide were blended together, and the solution was stirred in to form a smooth paste. The composition of the slurry, in percent by weight based on the total weight of slurry, was as follows (two decimals carried in computation to avoid a round-off discrepancy):

| | |
|---|---|
| $NH_4Cl$ | 8.78 |
| $ZnCl_2$ | 3.99 |
| $HgCl_2$ | 0.80 |
| Poly-sulfonic acid | 1.60 |
| Carbon | 6.65 |
| $H_2O$ | 25.00 |
| $MnO_2$ | 53.19 |
| | 100.0 |

EXAMPLE IX

Ten grams of Methocel 4000, described above, 340 grams of $NH_4Cl$, 154.5 grams of $ZnCl_2$, and 29.5 grams of $HgCl_2$ were dissolved in 990 grams of water. Four hundred grams of this solution was blended with six hundred grams of zinc dust by stirring under a nitrogen blanket for one hour. The resulting slurry had the following composition, in percent by weight based on the total weight of slurry:

| | |
|---|---|
| Carboxymethyl cellulose | 0.3 |
| Zinc | 60.0 |
| Water | 26.0 |
| $HgCl_2$ | 0.8 |
| $NH_4Cl$ | 8.9 |
| $ZnCl_2$ | 4.0 |
| | 100.0 |

Batteries were made with the same structures and sizes described above, but using 2.5 grams of the slurry of Example VIII above for each cathode, and 1.3 grams of the slurry of Example IX above for each anode. Results of the electronic flash and camera test described above for these batteries are given in Table II below, in the same form as expressed in Table I above, except that values for only ten cycles were recorded for each battery, and that the sum S for the averages of the batteries are given rather than the individual values. In the table, the bracketed entry for $\Delta t$, battery No. 7, cycle 7 was not observed, but interpolated from adjacent observed values.

TABLE II

| | BATTERY | | | | | | | |
|---|---|---|---|---|---|---|---|---|
| | 1 | 2 | 3 | 4 | 5 | 6 | 7 | Ave. |
| CYCLE | $\Delta t$ | $\Delta t$ | $\Delta t$ | $\Delta t$ | $\Delta t$ | $\Delta t$ | $\Delta t$ | S |
| 1 | 5.4 | 5.0 | 5.0 | 7.8 | 4.4 | 5.0 | 4.2 | 5.26 |
| 2 | 5.8 | 5.4 | 5.4 | 8.6 | 4.8 | 5.4 | 4.8 | 11.00 |
| 3 | 6.6 | 6.2 | 6.0 | 9.8 | 5.2 | 6.0 | 5.0 | 17.40 |
| 4 | 7.2 | 7.0 | 6.4 | 11.0 | 5.4 | 6.6 | 5.4 | 24.40 |
| 5 | 7.8 | 7.5 | 7.2 | 12.2 | 5.8 | 7.2 | 5.8 | 32.04 |
| 6 | 8.2 | 8.5 | 7.8 | 13.0 | 6.2 | 7.8 | 6.2 | 40.29 |
| 7 | 8.8 | 9.5 | 8.3 | 14.4 | 6.4 | 8.4 | [6.6] | 49.20 |
| 8 | 9.4 | 11.0 | 9.0 | 16.0 | 6.8 | 8.6 | 7.0 | 58.89 |
| 9 | 10.8 | 13.5 | 10.0 | 18.0 | 7.8 | 9.6 | 7.4 | 69.90 |
| 10 | 12.2 | 17.0 | 10.8 | 21.0 | 8.0 | 10.8 | 7.8 | 82.41 |

It will be seen that the average performance of these batteries, as measured by the average cumulative time for ten cycles of 82.41 seconds, is approximately equal to the cumulative time of 83 seconds for the dry patch battery with 2.5 to 3 grams of cathode in Table I above, while the construction of the slurry electrode batteries is considerably simplified. Further, it has been found that batteries, particularly hand made batteries of the kind here described, tend to perform quite consistently, if consistently made, and that unusually poor performance generally indicates poor seals or other errors in assembly. Thus, it is quite probable that the very poor performance of battery No. 4 in Table II above, compared with the others, is not typical of the results that can be expected of batteries of this kind. When it is left out of the culmination, the average value of S for 10 cycles is 74.2 seconds, or a considerable improvement over all of the dry patch batteries represented in Table I above.

EXAMPLE IX 168 grams of zinc powder and 8.4 grams of carbon black were blended together. 5 grams of HgCl$_2$ were dissolved in 100 ml. of water, and the powder blend was dispersed in this solution with stirring. Approximately 15 ml. of a solution made from 500 ml. of water, 25 grams of ZnCl$_2$ and 55 grams of NH$_4$Cl was stirred into the dispersion to form an anode slurry that was somewhat gritty, but workable.

Four cell batteries were made, using from 1.3 to 1.5 grams of the above slurry for each cell. Cellophane separators were employed. The cathodes each comprised 3.5 grams of a cathode slurry of the following composition, given in percent by weight:

|  | % |
|---|---|
| MnO$_2$ | 51.81 |
| Carbon black | 6.48 |
| ZnCl$_2$ | 4.35 |
| NH$_4$Cl | 9.56 |
| H$_2$O | 27.80 |
|  | 100.0 |

At equilibrium, the composition of the anode slurries would be approximately as follows, in percent by weight:

| Zinc | 51.0 |
|---|---|
| Mercury (Amalgamate with the Zinc) | 3.4 |
| Carbon black | 2.6 |
| NH$_4$Cl | 7.3 |
| ZnCl$_2$ | 4.1 |
| H$_2$O | 31.6 |
|  | 100.0 |

These batteries were tested using the electronic flash unit described above, but without the camera. The average performance, based on at least three batteries, was 17 charge cycles before reaching 3.0 volts C.C.V., and the recharge time for the tenth cycle was 6.1 seconds. This test was repeated with a second batch of at least three of the batteries, but with a 50 pound load on each battery during the test. The average number of cycles before reaching 3.0 volts was 21, and the average recharge time for the tenth cycle was 5.6 seconds. These results indicate that batteries incorporating both slurry anodes and slurry cathodes exhibit good performance under high current drain conditions without the application of external compressive stresses.

While the invention has been described with reference to the specific details of various illustrative embodiments, many changes and variations will occur to those skilled in the art upon reading this description. Such can obviously be made without departing from the scope of the invention.

Having thus described the invention, what is claimed is:

1. A thin flat laminar battery comprising series connected Leclanche cells in each of which cells there is a zinc anode and a cathode, said cathode comprising a slurry dispersion of MnO$_2$ and carbon in an electrolyte solution containing zinc chloride, ammonium chloride and from about 23 to about 30 percent of water, based on the weight of dispersion, said dispersion containing a polymeric dispersing agent.

2. A laminar battery comprising series connected superposed Leclanche cells in each of which cells there is a zinc anode and a cathode, said cathode comprising a slurry dispersion of carbon and manganese dioxide in an aqueous solution of electrolytes, said electrolytes comprising a major proportion of ammonium chloride and a minor proportion of zinc chloride by weight, said dispersion containing a polymeric dispersing agent and between 25 and 28 percent of water, based on the total weight of said dispersion.

3. A laminar battery comprising series connected superposed Leclanche cells in each of which cells there is an anode whose electrochemically active ingredient is particulate zinc, and a cathode comprising a slurry dispersion of MnO$_2$ and carbon in an aqeuous solution of NH$_4$Cl and ZnCl$_2$ and a polymeric dispersing agent, said solution containing between 23 and 30 percent of water by weight, based on the weight of said dispersion.

4. The battery of claim 3 in which said anode in each of said cells comprises a slurry dispersion of zinc particles in an aqueous solution of ammonium chloride and zinc chloride containing from 25 to 40 percent of water by weight based on the weight of said zinc slurry dispersion.

5. A thin flat laminar battery comprising a plurality of superposed cells electrically connected together in series aiding relationship through electronically conducting liquid impervious intercell connectors, said cells each comprising an anode, a cathode, and a separator between said anode and said cathode, said anodes each comprising an anode slurry of zinc powder in an aqueous solution of ammonium chloride and zinc chloride containing from 25 to 40 percent of water by weight based on the weight of said anode slurry, and said cathodes each comprising a cathode slurry of manganese dioxide and carbon black in an aqueous solution of ammonium chloride, zinc chloride and a polymeric dispersing agent containing fron 23 to 30 percent of water by weight, based on the weight of cathode slurry.

6. A planar primary battery including at least two cells positioned intermediate the opposed surfaces of a first and a second current collector and in which each of said cells includes, in combination:

a negative aqueous slurry electrode comprising a substantially uniform particulate dispersion of zinc anode particles in aqueous electrolyte containing a major proportion of ammonium chloride and a minor proportion of zinc chloride, the zinc particles being present in a concentration per unit area effective to provide an electrically conductive dispersion and the electrolyte present in intimate surface contact with the metallic particles in a concentration effective to provide an ionically conductive dispersion, and said zinc dispersion containing from 25 to 40 percent of water based on the weight of said dispersion;

a positive aqueous slurry electrode comprising a substantially uniform particulate dispersion of cathodic mix particles of manganese dioxide and carbon in a substantially uniform distribution of aqueous electrolyte containing a major proportion of ammonium chloride and a minor proportion of zinc chloride, the cathodic particles present in a concentration per unit area effective to provide an electrically conductive dispersion and the electrolyte present in intimate surface contact with the cathodic particles in a concentraton effective to provide an ionically conductive dispersion, said aqueous electrolyte in said positive slurry containing a polymeric dispersing agent and said positive slurry containing from 23 to 30 percent of water by weight, based on the weight of said positive slurry; and an electrolyte ion permeable separator adapted to be wetted on contact with the electrolyte of the electrodes positioned intermediate the negative and positive electrodes and in contact with said electrolyte of the electrodes.

7. The planar primary battery of claim 6 in which said negative slurry electrode in each of said cells includes a polymeric dispersing agent.

8. The planar primary battery of claim 7 in which said polymeric dispersing agents are hydrophilic polymers.

9. The planar primary battery of claim 6 in which said manganese dioxide and carbon are present, respectively, in a weight-to-weight ratio from between about 6:1 and 12:1.

10. The planar primary battery of claim 9 in which said manganese dioxide and carbon are present, respectively, in a weight-to-weight ratio of 8:1.

11. The planar primary battery of claim 6 including a continuous frame-type electrically insulative sheet seal positioned about each said slurry electrode dispersion and having an inner opening the periphery of which extends outwardly from said dispersion but over the periphery of and adjacent said separator, said seal having an outer peripheral portion extending beyond the peripheries of said first and second current collectors and separator to define continuous border sealing portions, mutually adjacent ones of said seals being mutually intersealed about said border sealing portions and being sealed to adjacent ones of said current collectors.

12. The planar primary battery of claim 6 in which at least said negative slurry electrode aqueous electrolyte further includes mercuric chloride.

13. A thin, flat laminar battery including a plurality of series connected superposed Leclanche cells in each of which there is a manganese dioxide cathode and an anode, said anode consisting essentially of a dispersion of particles of surface amalgamated zinc in an electrolyte solution containing zinc chloride, ammonium chloride, a polymeric dispersing agent, and from about 25 to about 40 percent of water, based on the weight of dispersion.

14. A laminar battery comprising a plurality of series connected superposed Leclanche cells in each of which there is a manganese dioxide cathode and an anode, said anode comprising a dispersion of zinc powder in an aqueous solution of electrolytes, said electrolytes comprising a major proportion of ammonium chloride and a minor proportion of zinc chloride by weight, said dispersion containing between 25 and 40 percent of water, based on the total weight of said dispersion.

15. A laminar battery comprising a series of superposed contiguous Leclanche cells in each of which there is an anode whose electrochemically active ingredient is of particulate zinc dispersed in an aqueous solution of electrolytes containing zinc chloride and ammonium chloride, said zinc dispersion containing from 25 to 35 percent of water based on the weight of said dispersion, and a cathode comprising a cathode dispersion of $MnO_2$ and carbon in an aqueous solution of electrolytes and a polymeric dispersing agent, said cathode dispersion containing between 23 and 30 percent of water by weight, based on the weight of said dispersion.

16. A laminar battery comprising a series of superposed contiguous Leclanche cells in each of which there is a manganese dioxide cathode and an anode, said anode comprising a dispersion of zinc particles with a minor proportion of carbon particles in an aqueous solution of electrolytes, and a cathode comprising a dispersion of $MnO_2$ and carbon in an aqueous solution of $NH_4Cl$, $ZnCl_2$, and a polymeric dispersing agent, said solution in the cathode containing between 23 and 30 percent of water by weight, based on the weight of said dispersion.

17. A thin, flat laminar battery comprising a plurality of superposed cells electrically connected together in series aiding relationship through electronically conducting liquid impervious intercell connectors, said cells each comprising an anode, a cathode, and a separator between said anode and said cathode, said anodes each comprising an anode slurry of a major proportion of zinc powder and a minor proportion of carbon black in an aqueous solution of ammonium chloride and zinc chloride containing from 25 to 40 percent of water by weight based on the weight of said anode slurry, and said cathodes each comprising a cathode slurry of manganese dioxide and carbon black in an aqueous solution of ammonium chloride, zinc chloride and a polymeric dispersing agent containing from 23 to 30 percent of water by weight, based on the weight of cathode slurry.

18. A thin, flat laminar battery comprising a series of superposed contiguous Leclanche cells in each of which there is a manganese dioxide cathode and an anode, said anode consisting essentially of a dispersion of particles of surface amalgamated zinc and carbon black in an electrolyte solution containing zinc chloride, ammonium chloride and from about 25 to about 40 percent of water, based on the weight of dispersion.

19. A laminar battery comprising a series of superposed contiguous Leclanche cells in each of which there is a manganese dioxide cathode and an anode, said anode comprising a dispersion of a major proportion of zinc powder and a minor proportion of carbon black in an aqueous solution of electrolytes, said electrolytes comprising a major proportion of ammonium chloride and a minor proportion of zinc chloride by weight, said dispersion containing between 25 and 40 percent of water, based on the total weight of said dispersion.

20. A laminar battery comprising a series of contiguous superposed Leclanche cells in each of which there is an anode comprising of particulate zinc and carbon particles dispersed in an aqueous solution of ammonium chloride and zinc chloride, said anode dispersion containing from 25 to 40 percent of water based on the weight of said dispersion, and a cathode comprising a cathode dispersion of $MnO_2$ and carbon in an aqueous solution of ammonium chloride and zinc chloride and a polymeric dispersing agent, said cathode dispersion containing between 23 and 30 percent of water by weight, based on the weight of said dispersion.

21. A thin, flat laminar battery suitable for use in high current drain applications without external compressive stress applying members and comprising a plurality of superposed cells electrically connected together in series relationship through flexible electronically conducting liquid impervious intercell connectors, said cells each comprising an anode, a cathode, and a separator between said anode and said cathode, said anodes each comprising an anode slurry of zinc powder in an aqueous solution of ammonium chloride and zinc chloride, said anode slurry containing from 25 to 40 percent of water by weight based on the weight of said anode slurry,, and said cathodes each comprising a slurry of manganese dioxide and carbon black in an aqueous solution of ammonium chloride, zinc chloride and a polymeric dispersing agent, each of said cathode slurries containing between 23 and 30 percent of water by weight, based on the weights of said cathode slurries.

22. A thin, flat primary battery suitable for use in high current drain applications without external compressive stress applying members and including at least one cell positioned intermediate the opposed surfaces of a first and a second current collector, each such cell comprising a negative aqueous slurry electrode comprising a substantially uniform particulate dispersion of zinc particles in aqueous electrolyte, a positive aqueous slurry electrode comprising a substantially uniform particulate dispersion of manganese dioxide and carbon particles in an aqueous electrolyte containing a polymeric dispersing agent, and an electrolyte ion permeable separator adapted to be wetted on contact with the electrolyte of the electrodes positioned intermediate the negative and positive electrodes and in contact with said electrolyte of the electrodes, said aqueous electrolyte in said negative slurry dispersion comprising a solution of ammonium chloride and zinc chloride, said negative slurry dispersion containing from 25 to 40 percent of water based on the weight of said negative slurry dispersion, said aqueous electrolyte in said positive slurry dispersion comprising a solution of ammonium chloride and zinc chloride, and said positive slurry dispersion containing from 23 to 30 percent of water by weight based on the weight of said positive slurry dispersion.

23. A thin, flat laminar battery suitable for use in high current drain applications without external compressive stress applying members and comprising a plurality of superposed cells electrically connected together in series aiding relationship through electronically conducting liquid impervious intercell connectors, said cells each comprising an anode, a cathode, and a separator between said anode and said cathode, said anodes each comprising a slurry of zinc particles in an aqueous solution of electrolyte, and said cathodes each comprising a slurry of manganese dioxide particles in an aqueous solution of electrolytes and containing a polymeric dispersing agent, said electrolytes in said anodes and cathodes comprising ammonium chloride and zinc chloride, each of said anode slurries containing from 25 to 40 percent of water by weight based on the weight of anode slurry, and each of said cathode slurries containing from 23 to 30 percent of water by weight based on the weight of cathode slurry.

* * * * *